Sept. 20, 1971  R. O. KAUFMAN, SR  3,606,580
HOLLOW AIRFOIL MEMBERS
Filed Sept. 10, 1969  3 Sheets-Sheet 1
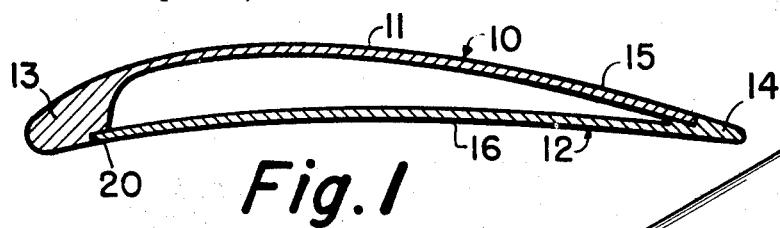
Fig. 1
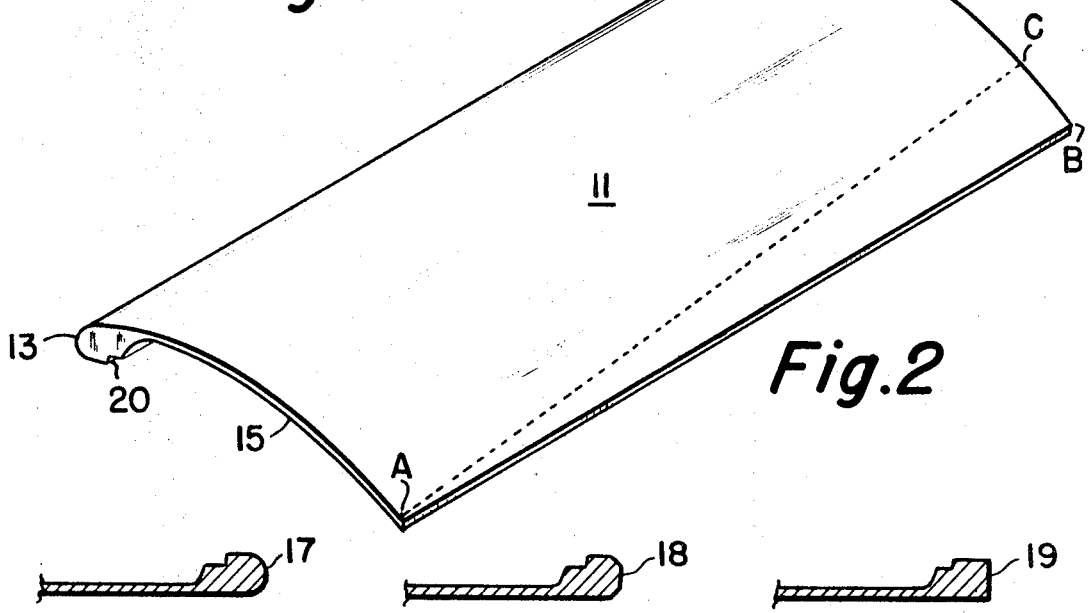
Fig. 2
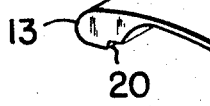
Fig. 3
Fig. 4
Fig. 5
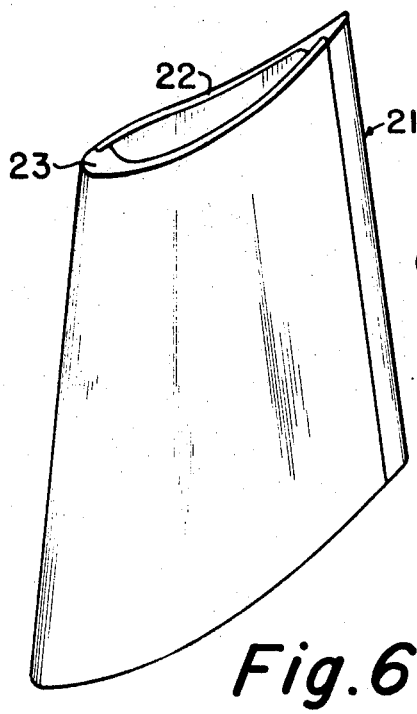
Fig. 6
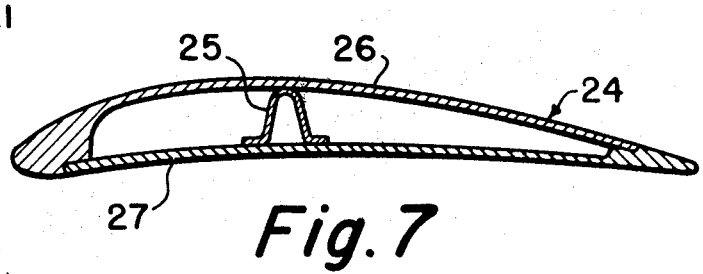
Fig. 7
INVENTOR.
Ralph O. Kaufman, Sr.
BY
Webb Burden Robinson & Webb
HIS ATTORNEYS Sept. 20, 1971   R. O. KAUFMAN, SR   3,606,580
HOLLOW AIRFOIL MEMBERS
Filed Sept. 10, 1969   3 Sheets-Sheet 2
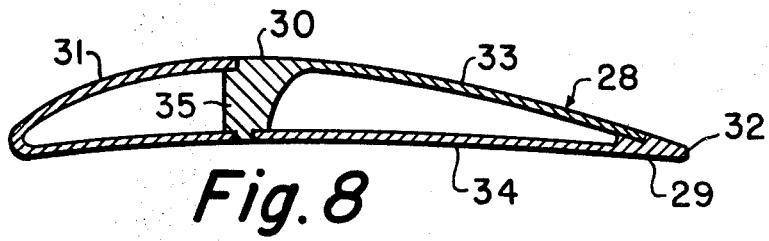
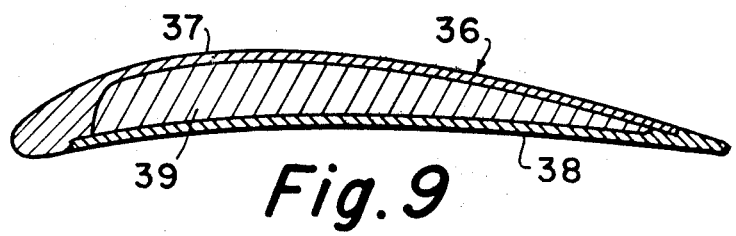
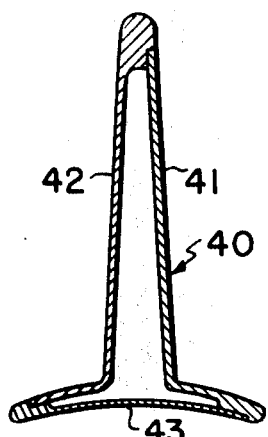
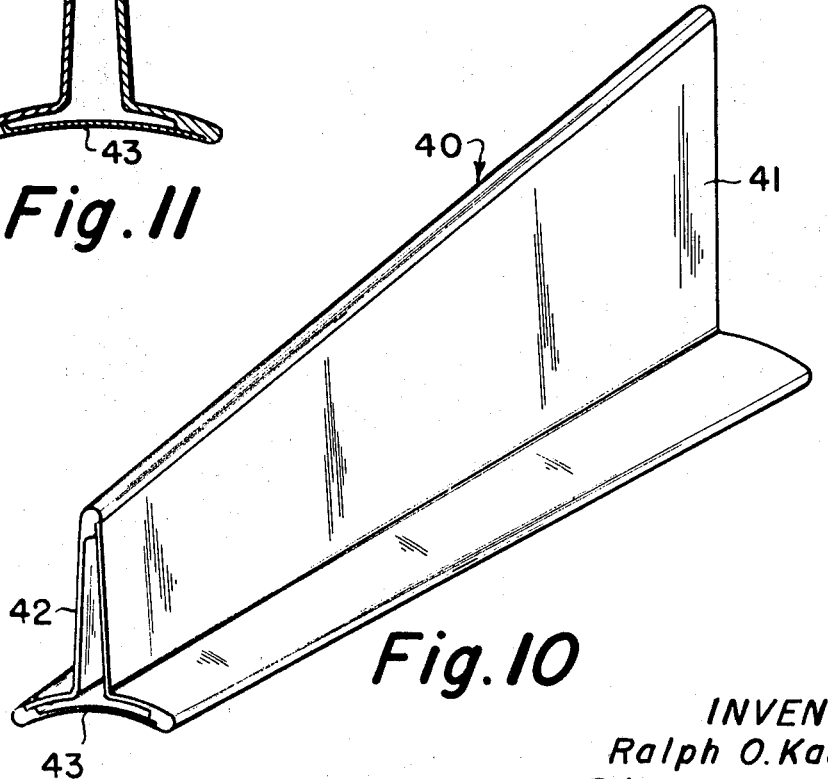
INVENTOR.
Ralph O. Kaufman, Sr.
BY
Webb Burden Robinson & Webb
HIS ATTORNEYS Sept. 20, 1971    R. O. KAUFMAN, SR    3,606,580
HOLLOW AIRFOIL MEMBERS
Filed Sept. 10, 1969    3 Sheets-Sheet 3

INVENTOR.
Ralph O. Kaufman, Sr.
BY Webb Burden Robinson & Webb
HIS ATTORNEYS

United States Patent Office 3,606,580
Patented Sept. 20, 1971

3,606,580
HOLLOW AIRFOIL MEMBERS
Ralph O. Kaufman, Sr., Titusville, Pa., assignor to Cyclops Corporation, Universal-Cyclops Specialty Steel Division, Pittsburgh, Pa.
Continuation-in-part of application Ser. No. 823,924, May 12, 1969. This application Sept. 10, 1969, Ser. No. 864,927
Int. Cl. F01d 5/18
U.S. Cl. 416—232       3 Claims

ABSTRACT OF THE DISCLOSURE

A hollow airfoil member comprising at least two connected wrought metal components, each component having a specially formed edge configuration and a plain formed remaining portion. The hollow airfoil member is formed by connecting the plain formed portion of the first component with the specially formed edge configuration of the second component and connecting the plain formed portion of the second component with specially formed edge configuration of the first component, these connections being inward from the outer extremities of the specially formed edge configurations.

---

This application is a continuation-in-part of my application Ser. No. 823,924, filed May 12, 1969.

This invention relates to hollow airfoil members and more particularly to airfoil members and their supports for use as vanes and blades in gas turbines, steam turbines, torque converters and the like, and as components for missile fins, wings, helicopter rotors, other aerodynamic components and their supports.

Current power sources such as steam and gas turbines and power conversion units such as torque converters all have specially shaped parts which aid in transmitting the input form of energy into an output mechanical form of energy such as providing mechanical torque to a shaft adaptable for rotation. These specially shaped parts through the years have been termed blades where they are rotating members and vanes where they are stationary members.

The shape requirements for these blades and vanes varies with the intended application. Even within a given power application, the shape of the various members varies. For example, many gas turbines employ several compressor stages, each stage potentially having a differing shape requirement for its blades and vanes.

Many blades and vanes are tapered to provide a more streamlined shape to accomplish a more efficient operation. This is typical in an axial flow gas turbine where the portion of the blades and vanes exposed to the gas flow are called airfoil sections and are often tapered to afford the greatest efficiency in transferring heat energy into mechanical energy.

In addition to the shape requirements, the material selection is also very important since the weight and the chemical and physical property requirements also vary with the intended application. Many solid vanes and blades must be made of expensive metals or metal alloys because a comparable less expensive solid, e.g. steel, is just too heavy or does not possess the properties necessary for efficient operation.

These same requirements, as set out hereinbefore, are also applicable to missile fins, propellers and other similar members which are affected by the flow of air or other media acting upon their surfaces.

To meet these various requirements, many manufacturing methods have been employed either singly or in combination incorporating both solid sections and solid or joined hollow sections. These manufacturing methods used heretofore include, but are not limited to, forging, casting, cold drawing, extruding, cold rolling and machining.

My invention, by providing a hollow airfoil member, results in a lighter product as compared to a similar solid product of identical configuration and of the same metal. This in turn presents greater freedom in material selection and in substitution of materials. My invention further provides for high volume production because of the various processes available to make the several requisite components of the airfoil member. My invention also is readily adapted to producing tapered airfoil members. My invention further provides a well balanced and efficiently operating member by having a section of increased weight present both at the leading and trailing edges of the airfoil member. Because of this increased efficiency, either smaller or fewer members need be employed to achieve the same output, or in the alternative, a smaller engine may be employed to maintain the same output. My invention provides further advantages in strength and design since the joining of the members whether by welding or other means occurs in an area spaced inwardly from the extreme ends of the airfoil members. Further, my invention provides simplified means to control the temperature, i.e., either to cool or heat the airfoil members. My invention also permits the use of wrought metals regardless of their specific composition.

A particular advantage of my invention is the ability to produce the required configurations in long bars or strips by various processes, such as precision rolling, extrusion, cold rolling or other methods of forming. These long lengths may then be cut or blanked to the exact length required for the particular airfoil, thus further increasing the high productivity of these members.

My invention also provides an airfoil member which may be fastened to the base member by various methods. It may be welded to the inner face of the base, inserted through a hole in the base and flanges bent and welded or brazed to hold it in place, or inserted through a hole in the base with the outer portion chamfered or flanged and having the outer portion of the airfoil similarly chamfered and flanged and welded, brazed, or fastened in position by other means.

My invention is a hollow airfoil member comprising at least two separately formed and joined components. Each component has a specially formed edge configuration and a plain formed remaining portion. The components are always joined so the specially formed edge configuration of the first component is connected to the plain formed remaining portion of the second component and the specially formed edge configuration of the second component is connected to the plain formed remaining portion of the first component. The individual components may be processed to produce a resultant tapered airfoil member. Internal supports may be provided where requirements so dictate. A further modification includes filling the hollow portion of the airfoil member with a filler material different than the base material.

In the accompanying drawings, I have shown my presently preferred embodiments of my invention in which:

FIG. 1 is a section through a hollow airfoil member;

FIG. 2 is an isometric view of the upper component of an airfoil section;

FIG. 3 is a section through a specially formed rounded edge;

FIG. 4 is a section through a specially formed chamfered edge;

FIG. 5 is a section through a specially formed square edge;

FIG. 6 is an isometric view of a tapered airfoil member;

FIG. 7 is a section through a hollow airfoil member having an internal supporting rib;

FIG. 8 is a section through a hollow airfoil member having an integral supporting rib;

FIG. 9 is a section through an airfoil member containing a filler in the airfoil's hollow section;

FIG. 10 is an isometric of a tapered fin made of these components;

FIG. 11 is a full section through the fin on FIG. 10;

Figure 12:
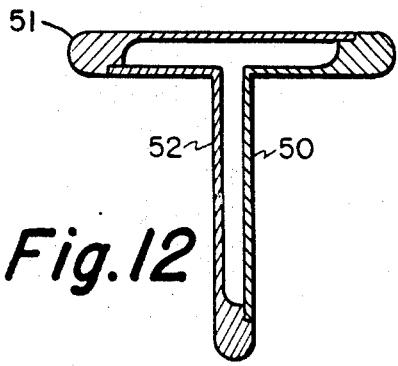
FIG. 12 is a section through a T support member.

It will be appreciated by those skilled in the art that my invention is adaptable to various gas and steam turbine blades and vanes, various blades for torque converters, helicopter rotors, missile fins, wings, aerodynamic components in general, and other similar applications including the structural supports for these various members. However, for ease of presentation, I will generally refer to all these various members merely as hollow airfoil members since they are all acted upon by air or some other media which acts upon the surface of the member or serve as supporting members for these surfaces which are so acted upon.

I have shown a typical airfoil member 10 of my invention in FIG. 1. Airfoil member 10 is hollow and comprised of two connected components, namely, upper component 11 and lower component 12. Each component 11 and 12 has a specially formed edge configuration 13 and 14, respectively, and a plain formed remaining portion 15 and 16, respectively. The specially formed edge configuration 13 and plain formed remaining portion 15 of upper component 11 is illustrated in FIG. 2. The particular edge geometry desired can be obtained by the various precision rolling, extrusion, cold drawing or other forming techniques. In other words, the desired edge configuration 13 can be formed by one of these above-identified methods while the remaining portion 15 can likewise be formed by one of these methods which imparts a required shape to the balance of the component. Once rolled, the component is formed by well-known techniques to the desired shape such as the slight curvature illustrated in FIG. 2.

There are a variety of specially formed edge configurations or geometries which may be employed, such as those illustrated in FIGS. 3–5, depending upon the ultimate desired use and requirements of the airfoil member. I have illustrated in FIG. 3 a rounded edge configuration 17; whereas in FIGS. 4 and 5, I have illustrated a chamfered edge 18 and a square edge 19, respectively. The rounded edge configuration is most often employed where a streamline effect is required, such as turbine blades; whereas the other edge configurations are more applicable to structural support members.

The components 11 and 12 are joined by brazing, welding, or other connecting techniques. The joining of the two components is effected in such a way that the specially formed edge configuration 13 of component 11 is joined to the plain formed portion 16 of component 12 and the plain formed portion 15 of component 11 is joined to the specially formed edge configuration 14 of component 12. This then balances the weight distribution of the airfoil member 10 by having a heavier section positioned at both the leading and trailing end of the airfoil member 10.

The specially formed edge configuration is shaped so that a small recess 20 is present inward of the extreme end of the specially formed edge to mate with the end of the plain formed remaining portion of the second component (see FIGS. 1 and 2). This then maintains the streamline nature of the airfoil member without placing the connection at the extreme ends where it would be more susceptible to damage.

The exact connecting technique is, of course, dependent on the materials employed. Since the rolling and forming processes are adaptable to all wrought metals, the choice of materials is large and will be dependent on the weight, physical or chemical characteristics of the particular intended application.

The airfoil member according to my invention may also be tapered as illustrated in FIG. 6. To arrive at this taper, the individual upper and lower components 22 and 23 are blanked at an angle to a somewhat trapezoidal shape prior to connecting. For example, the blank of component 11, shown in FIG. 2, could be prepared for a tapered airfoil member 21 by removing, by cutting or blanking the triangular section designated by sides AB, AC, CB or triangle ABC in FIG. 2. Then by doing the same for the second component and joining the remaining somewhat trapezoidally shaped blanks, as described hereinbefore, a hollow tapered airfoil member 21 is formed. Where the airfoil members require forming prior to the joining, this may be accomplished either during or subsequent to the blanking or cutting operation.

It will be noted that the portion of the wrought metal removed for a tapered blank is relatively small compared to the entire component, thereby maintaining an appreciable yield and efficiency advantage over tapered airfoil members formed by other techniques, for example, forging and machining a solid blank.

Where size, strength or material requirements are such that an airfoil member, as described hereinbefore, will not meet the requirements of a particular application, a mid chord supporting rib such as that illustrated in FIG. 7 can be inserted in the hollow portion of the airfoil section to give additional support. Airfoil member 24 is formed in the same way as the earlier embodiments having an upper component 26 and a lower connected component 27 connected in the same manner as the above-described embodiments. A supporting rib 25 is positioned in the hollow portion of the airfoil section between the airfoil section ends and is secured to both the upper and lower components by a means compatible with the particular materials employed.

The rib can also be made an integral part of the components of the airfoil member as illustrated in FIG. 8. Airfoil member 28 comprises three components 29, 30 and 31. Component 29 has a specially formed edge configuration 32 which mates with the plain formed portion 33 of component 30. In turn, the plain formed portion 34 of component 29 mates with the specially formed edge configuration 35 of component 30. In this case, edge configuration 35 actually constitutes the integral supporting rib when the airfoil member is completely formed. Component 31 which has two plain formed ends is also connected to specially formed edge configuration 35. The result is that an internally supported airfoil member 30 is formed whereby two of three components are formed by connecting plain formed portions to specially formed edge configurations and the third component which is completely plainly formed is shaped to mate with the specially formed edge configuration of the component forming the integral supporting rib.

The airfoil member may also encapsulate a filler material different from the member material which fills the hollow portion of the member as shown in FIG. 9. Airfoil member 36 comprises an upper component 37 and a lower component 38 which are shaped and connected as in the earlier described embodiments. The cavity area of the airfoil member 36 is filled with a matrix of filler material 39. This filler material 39 may be a material of lesser density than the wrought metal components to enhance the strength without materially adding to the weight or it may be a highly heat transmitting substance to rapidly remove heat from the outer components. Again, the particular application will dictate the material requirements of the filler material.

A plurality of components shaped and connected in the manner described hereinbefore can be employed to construct various airfoil members or similarly shaped parts such as missile fins. I have illustrated in FIGS. 10 and 11 a hollow fin 40 comprised of three components 41, 42 and 43. Each component as in the earlier embodiments has a specially formed edge configuration and a plainly formed remaining portion. These components are blanked, as shown in the earlier described embodiments, to form a tapered fin (see FIG. 10). Each component is connected so that a plain formed portion of one component is mated with and connected to a specially formed edge configuration of another component, etc. However, in this embodiment, two of the components 41 and 42 contain a right angle bend so that a fin is formed having a web and a base section. It will be clear to those skilled in the art that a plurality of individual components, as described above, can be connected to form a variety of these hollow airfoil members and their supports and that the airfoil member need not be limited to just two components.

In FIG. 12 through FIG. 17, I have shown sections of some of the various support members which can be constructed using the concepts of my invention. While these various support members differ in shape and number of components, each one is constructed from components having a specially formed edge configuration and a plainly formed remaining portion. Just as in the earlier embodiments, these support members can be tapered to meet particular applications where strength and weight requirements vary from one end of the member to the other.

Figure 13:
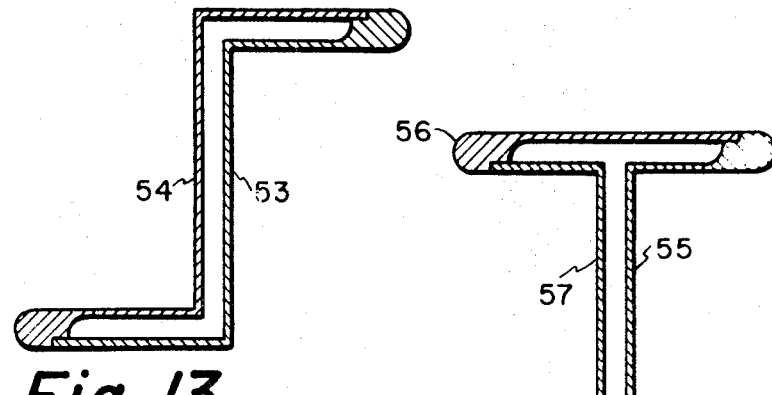
FIG. 13 is a section through another support member.
Figure 14:
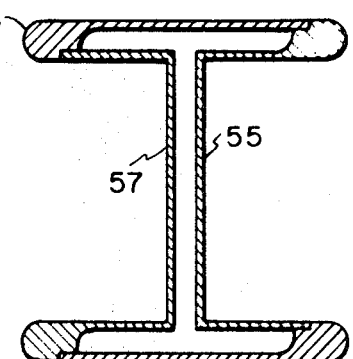
FIG. 14 is a section through an I support member.
Figure 15:
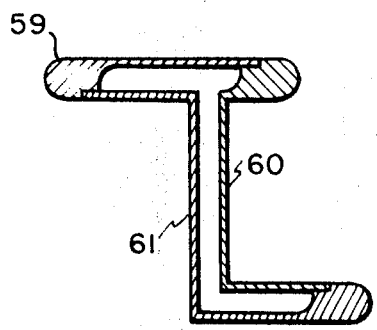
FIG. 15 is a section through another support member.
Figure 16:
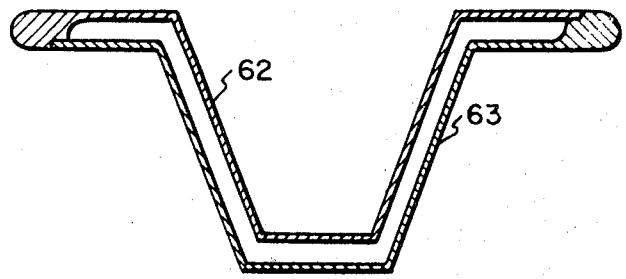
FIG. 16 is a section through still another support member.
Figure 17:
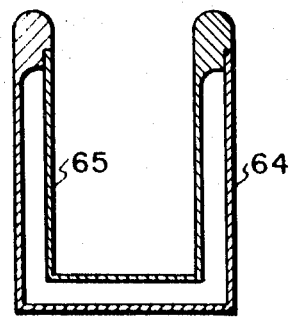
FIG. 17 is a section through a U support member.

In FIGS. 12 and 15, I have illustrated three component support members. The support member in FIG. 12 has components numbered 50, 51 and 52 and in FIG. 15, the components are numbered 59, 60 and 61. Two component support members are illustrated in FIG. 13, FIG. 16 and FIG. 17. In FIG. 13, the components are numbered 53 and 54; and in FIG. 16, the components are numbered 62 and 63; and in FIG. 17, the components are numbered 64 and 65. A four component system is illustrated in FIG. 14 where the components are numbered 55, 56, 57 and 58.

While I have shown and described preferred embodiments of my invention, it may be otherwise embodied within the scope of the appended claims.

I claim:
1. A tapered hollow airfoil member having a leading and trailing end comprising at least two connected wrought metal components, each of said components being substantially trapezoidally shaped and having a specially formed edge configuration and a plain formed remaining portion, said components cooperating such that a recess of the specially formed edge configuration of a first component mates with and is connected to an end of the plain formed remaining portion of a second component, each such connection being direct and continuous along a specially formed edge configuration and positioned inward of the extreme end thereof, the connections in the area of the leading and trailing ends being on opposite sides of the airfoil.

2. The tapered hollow airfoil member of claim 1 wherein an internal supporting rib is positioned within the hollow portion of the airfoil member in contact with said components and is connected thereto.

3. The tapered hollow airfoil member of claim 1 wherein a filler material completely fills the hollow portion of the airfoil member and is permanently affixed thereto, said filler material being at least one of less dense and more heat transmitting than said wrought metal components.

References Cited

UNITED STATES PATENTS

| | | | |
|---|---|---|---|
| 1,762,352 | 6/1930 | Ray | 416—232 |
| 2,124,549 | 7/1938 | Dicks | 416—233 |
| 2,212,170 | 8/1940 | Richardson | 416—233 |
| 2,293,801 | 8/1942 | Caldwell | 416—233 |
| 2,918,977 | 12/1959 | Fedan et al. | 416—233 |

EVERETTE A. POWELL, JR., Primary Examiner

U.S. Cl. X.R.

416—233